United States Patent [19]
Hawkins

[11] Patent Number: 4,460,306
[45] Date of Patent: Jul. 17, 1984

[54] WHEEL DOLLY

[76] Inventor: Patrick G. Hawkins, P.O. Box 3867, Greenville, S.C. 29608

[21] Appl. No.: 222,675

[22] Filed: Jan. 5, 1981

[51] Int. Cl.³ .............................................. B60B 29/00
[52] U.S. Cl. .................................. 414/427; 280/43.2; 414/668
[58] Field of Search ............... 414/427, 639, 428, 917, 414/589, 668, 664, 672, 663, 643, 785; 280/43.17–43.23, 43.2, 763–766; 254/8 C, 8 B, 8 R, 124

[56] References Cited

U.S. PATENT DOCUMENTS

| | | | |
|---|---|---|---|
| 2,217,898 | 10/1940 | Gemmill | 414/427 |
| 2,326,684 | 8/1943 | Ross | 414/427 |
| 2,386,516 | 10/1945 | Thompson | 254/8 R |
| 2,467,500 | 4/1949 | Salter . | |
| 2,490,233 | 12/1949 | Schildmeier | 414/427 |
| 2,583,216 | 1/1952 | Hoffman | 414/427 |
| 2,682,153 | 6/1954 | Fink, Sr. | 280/43.23 X |
| 2,833,549 | 5/1958 | Burch | 280/43.2 |
| 3,036,723 | 6/1962 | McCormick et al. . | |
| 3,145,859 | 8/1964 | Barosko . | |
| 3,749,265 | 7/1973 | Smith, Jr. . | |
| 3,836,027 | 9/1974 | Gardner | 414/427 |
| 3,847,294 | 2/1974 | Davenport . | |
| 3,951,287 | 4/1976 | Cofer . | |
| 4,050,597 | 9/1977 | Hawkins . | |
| 4,241,803 | 12/1980 | Lauber | 280/765 |
| 4,274,795 | 6/1981 | Taylor | 280/764 |

Primary Examiner—John J. Love
Assistant Examiner—L. E. Williams
Attorney, Agent, or Firm—Bailey & Hardaway

[57] ABSTRACT

A dolly is illustrated of the type generally employed for lifting and transporting vehicle wheels, especially the large wheel assemblies employed on truck rigs which utilizes longitudinally disposed tiltable frames for supporting the wheels, and a modified form of the invention contemplates a special leveling mechanism for the dolly.

5 Claims, 4 Drawing Figures

WHEEL DOLLY

BACKGROUND OF THE INVENTION

The prior art generally contemplates wheel dollies which are often of the type wherein a tiltable L-shaped frame is carried within a similarly shaped frame for elevation and tiltable adjustment. U.S. Pat. Nos. 2,217,898; 2,467,500; 3,036,723; 3,145,859; 3,749,265; 3,847,294; 3,951,287 and 4,050,597 are illustrative of the prior art.

A difficulty with such prior art structures is that the lower leg of the L-shaped support is, in effect, cantilevered so as to require relatively high lifting forces which places a strain on the moving parts because of the load being carried outwardly of the unsupported length of the legs.

An important object of the present invention is to provide supports for the wheels accommodating the wheels in transverse position thereon, but which has a support along the length of the tire support by fixed attachment at several points with respect to outwardly extending legs of a substantially L-shaped support.

Since the tiltable frames are adjusted insofar as front and rear tilt is concerned with respect to an outer frame by an intermediate pivotal connection, generally at the medial areas of the frames, the necessity for a second adjustment is avoided and such adjustment as attempted may be easily accomplished since the frame readily pivots about the central point.

Since tiltable longitudinal frame members afford support for the wheels in devices constructed in accordance with the present invention, relatively short lever arms may be employed which will further avoid the necessity for massive load transmitting elements.

Another important feature of the invention resides in providing a pivoted attachment for the frame and power operated means associated therewith with respect to forwardly extending legs of an outer frame. This makes possible positioning of the frames for wheel support in alignment with a spindle of the vehicle such as a truck from which the wheels are carried in only a single adjustment. If, as in the prior art constructions, it is necessary to raise the inner wheel carrying frame, a pivotal adjustment of the frame to bring the wheels into proper alignment with the spindle will thereafter necessitate a further adjustment in the height of the inner frame. By utilizing a structure in accordance with the present invention, only one height adjustment is necessitated since the same tilt adjustment is maintained through the entire wheel raising operation.

Another modified form of the invention contemplates utlizing only a single frame member wherein the tiltable frames are directly attached thereto. A tilted adjustment, providing the aforesaid advantages, is provided in a more conventional manner through the use of a rearwardly extending wheel, such as a caster which is mounted on a scissors-type arrangement comprising a pair of parallel legs which maintains the caster in proper vertical alignment at all times.

SUMMARY OF THE INVENTION

It has been found that an improved wheel dolly construction may be provided by utilizing the concept of frames which may be tilted up and down on longitudinal axis, supported at spaced points therealong, with the frames extending inwardly and in opposed relation. The frames and the power means for carrying it may be pivotally supported in a central portion thereof about an outer frame so that tiltable adjustment of the frames with respect to the vehicle spindle may be easily accomplished. As an alternative to the frame within a frame, and such central support facilitating tiltable adjustment, a more conventional caster may extend rearwardly and be supported in such a fashion as to maintain proper alignment through the use of parallel pivoted linkage mechanism with suitable power operated means for adjusting the vertical position of the caster, thus maintaining proper caster alignment for all positions of adjustment.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

A wheel dolly is illustrated having a substantially L-shaped support frame with a pair of spaced load carrying legs extending horizontally outwardly thereof. A pair of opposed inwardly extending frames A are tiltably carried on an axis adjacent respective load carrying legs. Power operated means B extend substantially along the axis having fixed connection to the frame adjacent each end thereof, tilting the frames up and down in unison for receiving and transporting wheels positioned transversely therebetween. The power operated means B includes a jack carried adjacent one end of each of the frames A intermediate thereof, a pair of shafts to which respective frames are fixed and linkage connecting the jack and the shafts. A modified form of the invention includes the load carrying legs and having a mounting carried by a pair of rearwardly extending parallel links C pivotally connected thereto. The links each have a further pivoted connection on the support. Means is provided for raising and lowering the mounting.

Figure 1:
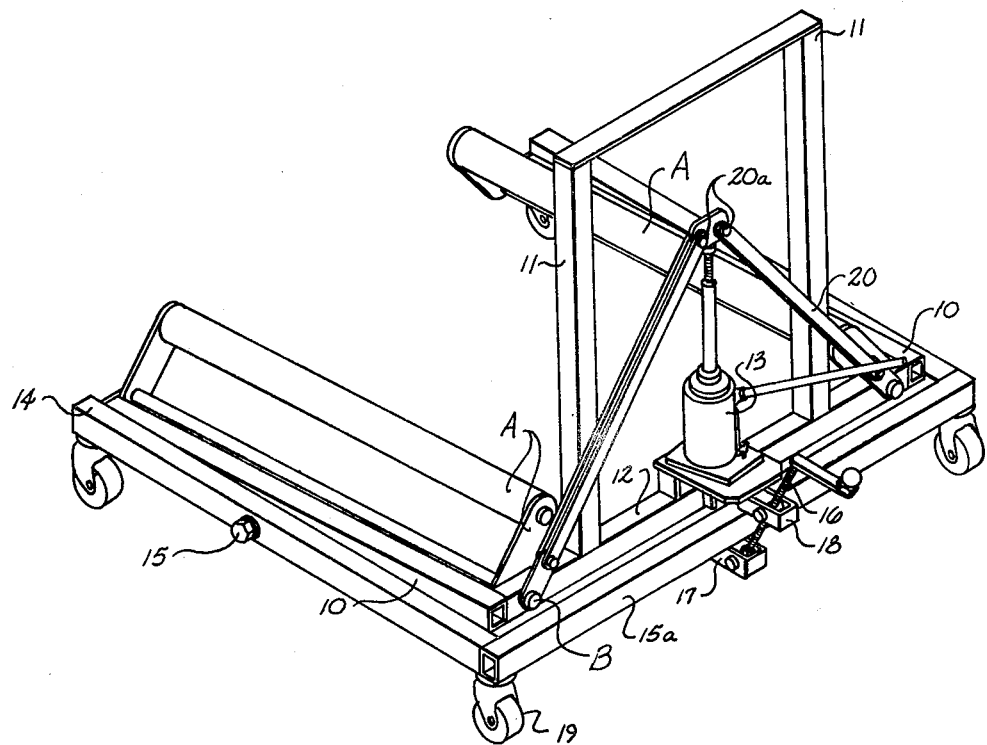
FIG. 1 is a rear perspective view illustrating the attachment of power operated means for raising and lowering the frames about a longitudinal axis about which they are tiltably carried.

Referring more particularly to FIG. 1, the wheel dolly is illustrated as having a substantially L-shaped support frame with a pair of load carrying legs 10 extending forwardly of a pair of spaced vertical posts 11 which are carried by a transverse connecting member 12 which serves as a support for a jack 13. An outer frame includes a pair of longitudinally extending load carrying legs 14 in substantial alignment with the frame members A about which the frame assemblies and power operated means connected thereto are pivotally carried as at 15. The tiltable adjustment of the frame members A and the power operated means connected thereto is accomplished through threadable adjustment of the elongated threaded member 16 which is supported on one end as at 17 by the outer frame and is threadable within an internally threaded member 18 carried upon the transverse frame member 12. It will be noted that the entire dolly is suitably mounted on casters 19.

Figure 2:
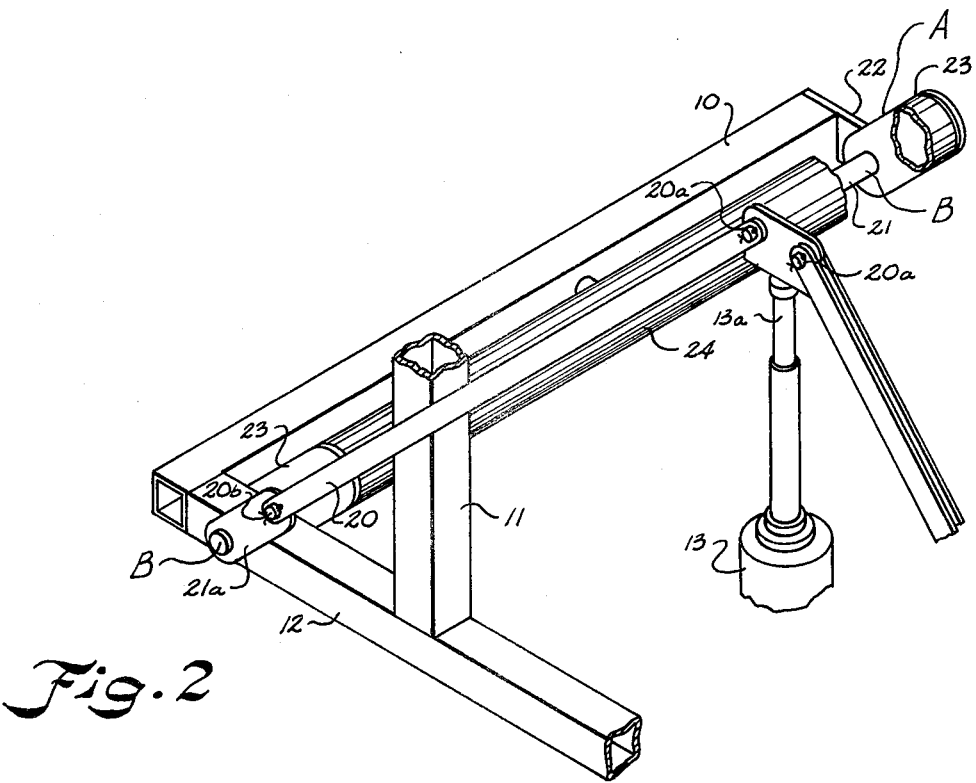
FIG. 2 is an enlarged perspective view with parts broken away, illustrating the mounting of the tiltable frames and a mode of attaching power operated means thereto.

Referring now particularly to FIG. 2, it will be noted that the jack 13, which is mounted upon the transverse frame 12 and has a ram 13a which has pivotal connection with linkage members 20, which diverges downwardly and outwardly for connection to a link 21, which, in turn, has fixed connection with a longitudinal shaft B. The shaft B is illustrated as being journaled on one end within the transverse frame member 12, and on the other end within a bracket 22 which extends outwardly and has fixed connection with the forwardly extending load carrying leg 10. The links 20 have pivotal connection with the ram as at 20a and with the respective links 21a as at 20b.

The tiltable frames are illustrated as comprising a pair of spaced offset arms 23 which carry a suitable mounting for a lower right member 24, which may be rigidly positioned but preferably is carried for rotation as about a suitable shaft fixed between the offset arms 23. As stated above, the entire tiltable assembly which includes the leg support 10 which may be pivoted as at 15 centrally about the outer frame member 14. In the alternative, the power operated means B, which generally includes the oscillatable shaft 21 and the linkage 20 and 21a, which is operated by the jack 13, and such mechanism is pivoted as at 15. It will be observed that a cam-like action is imparted through the linkage mechanism described as aforesaid, which facilitates the raising and lowering of the tires through relatively short linkage means which, because of the relatively low power ratios, affords the use of high powered jacks and heavy members.

Figure 3:
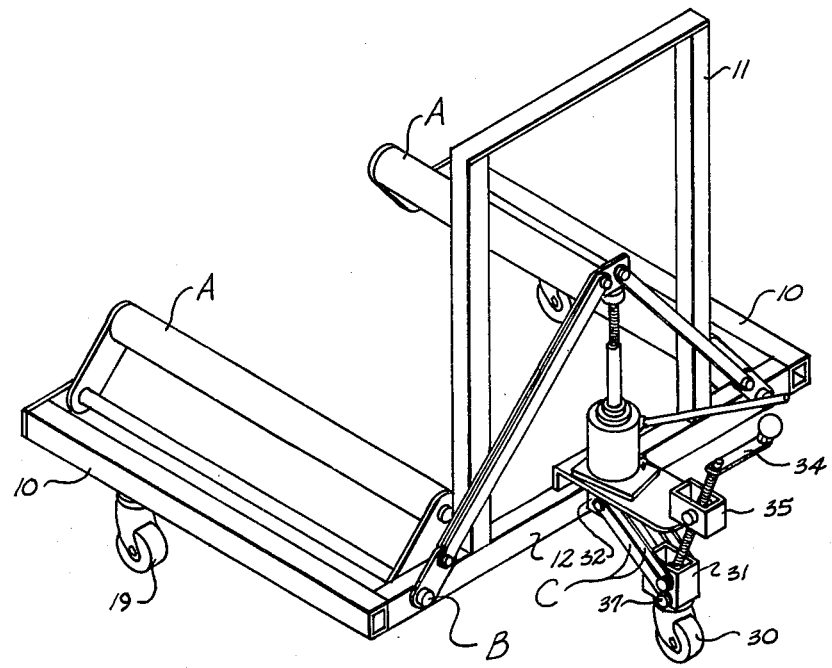
FIG. 3 is a rear perspective view illustrating a modified form of the invention wherein a rearwardly extending castor is carried for vertical adjustment in such a fashion as to maintain vertical alignment of the castor at all times.
Figure 4:
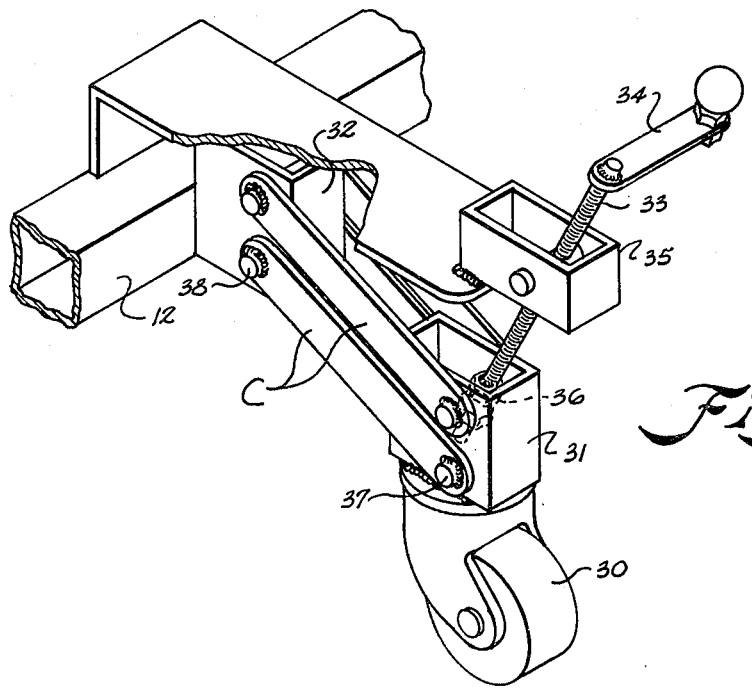
FIG. 4 is an enlarged perspective view illustrating the castor and means for adjustment of the mounting through the use of parallel links.

In the alternative, FIG. 3 illustrates a modified form of the invention wherein the use of outer frame members 15 and their transverse bridging member 15a are avoided. The casters 19 are attached directly to the forwardly extending horizontal legs 10, and a rearwardly extending caster 30 is provided having a mounting 31 which is to be maintained in alignment at all times. This is accomplished by attachment of the mounting 31 to a bracket 32 which is carried by the transverse frame member 12. A threadable member 33 is rotatably carried for adjustment by turning the crank arm 34 within a forwardly extending support 35 which is fixed with respect to the frame member 12. The threaded member 33 has connection as at 36 with the caster mounting 31 so that by raising and lowering the mounting, the mounting is maintained in its proper vertical alignment because of the parallel linkage members C. Each of the legs comprising the parallel linkage members C has respective connections on one end to the caster mounting as at 37 and on the other end as at 38 to the bracket 32.

It is thus seen that an improved wheel dolly has been provided utilizing tiltable frames which are supported at several points along their length which are provided with means for making a front and rear tiltable adjustment with improved means. One such means contemplates the frames about a point centrally thereof with regard to the longitudinally support leg, together with the power operated means connected thereto for operating the frames by raising and lowering them, or in the alternative, an improved caster is provided for extending rearwardly and raising and lowering the frame which carries the oscillatable longitudinal frames while maintaining proper vertical alignment. Alignment of the wheels with the spindle of the vehicle may be readily accomplished since the central mounting arrangement of the frames will not require an additional adjustment, whereas the rearwardly extending caster provides a special means of adjusting the structure of the present invention in its preferred embodiment, but has an alternative function in connection with this or any dolly wherein such tiltable features are desirable. If desired, the offset arms 23 may be made extensible, (not shown) to carry a variety of wheels including those on farm tractors.

While a preferred embodiment of the invention has been described using specific terms, such description is for illustrative purposes only, and it is to be understood that changes and variations may be made without departing from the spirit and scope of the following claims.

What is claimed is:

1. In a wheel dolly having a substantially L-shaped support frame with a pair of spaced load carrying legs extending horizontally, the improvement including:
   a pair of opposed inwardly extending frames tiltably carried on an axis adjacent and parallel with respective load carrying legs; and
   elongated oscillatable power operated means including a shaft extending substantially along each of said axis having spaced fixed connections to said inwardly extending frame tilting said frames simultaneously up and down on said axis for receiving and transporting wheels transversely positioned therebetween.

2. The structure set forth in claim 1 wherein said power operated means includes a jack carried adjacent one end of each of said frames intermediate thereof respective frames are fixed to said pair of shafts and linkage connecting said jack and said shafts.

3. The structure set forth in claim 1 including a wheeled assembly extending rearwardly between said load carrying legs, said wheeled assembly having a mounting carried by a pair of rearwardly extending parallel links pivotally connected thereto, said links each having a further pivoted connection on said support, and means raising and lowering said mounting.

4. The structure set forth in claim 2 including links having pivotal connection on one end to said jack and on the other end to a free end of a link fixed to a respective shaft.

5. The structure set forth in claim 1 wherein respective frames are pivotally mounted on a respective intermediate portion of said spaced load carrying legs.

* * * * *